United States Patent
Lamberton et al.

(10) Patent No.: US 6,754,220 B1
(45) Date of Patent: Jun. 22, 2004

(54) SYSTEM AND METHOD FOR DYNAMICALLY ASSIGNING ROUTERS TO HOSTS THROUGH A MEDIATOR

(75) Inventors: Marc Lamberton, Antibes (FR); Eric Levy-Abegnoli, Nice (FR); Pierre Secondo, Vence (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/568,690

(22) Filed: May 11, 2000

(30) Foreign Application Priority Data

May 31, 1999 (EP) .......................................... 99480040

(51) Int. Cl.[7] .............................................. H04L 12/28
(52) U.S. Cl. ...................... 370/401; 370/389; 370/217; 714/4; 340/2.1; 709/105; 709/249; 709/235
(58) Field of Search ................................ 370/216, 217, 370/218, 242, 245, 401, 229, 230, 230.1, 235, 237, 389; 710/7, 20, 29; 340/825.01, 2.1; 714/1, 2, 3, 4; 709/105, 234, 235, 238, 239, 249

(56) References Cited

U.S. PATENT DOCUMENTS

| | | | | |
|---|---|---|---|---|
| 5,371,852 A | * | 12/1994 | Attanasio et al. | 709/245 |
| 5,572,528 A | * | 11/1996 | Shuen | 370/402 |
| 5,708,654 A | * | 1/1998 | Arndt et al. | 370/242 |
| 5,742,587 A | * | 4/1998 | Zornig et al. | 370/235 |
| 5,835,696 A | * | 11/1998 | Hess | 714/10 |
| 5,923,854 A | * | 7/1999 | Bell et al. | 709/243 |
| 6,049,528 A | * | 4/2000 | Hendel et al. | 370/235 |
| 6,081,845 A | * | 6/2000 | Kanemaki et al. | 709/238 |
| 6,119,143 A | * | 9/2000 | Dias et al. | 709/201 |
| 6,178,455 B1 | * | 1/2001 | Schutte et al. | 709/228 |
| 6,243,379 B1 | * | 6/2001 | Veerina et al. | 370/289 |
| 6,266,335 B1 | * | 7/2001 | Bhaskaran | 370/399 |
| 6,335,926 B1 | * | 1/2002 | Silton et al. | 370/351 |
| 6,397,260 B1 | * | 5/2002 | Wils et al. | 709/238 |
| 6,510,164 B1 | * | 1/2003 | Ramaswamy et al. | 370/466 |
| 6,556,547 B1 | * | 4/2003 | Srikanth et al. | 370/317 |

OTHER PUBLICATIONS

Newton, Harry, "Newton's Telecom Dictionary, 14th Edition", 1998, Flatiron Publishing, p. 60.*

* cited by examiner

Primary Examiner—Alpus H. Hsu
Assistant Examiner—Michael J Molinari
(74) Attorney, Agent, or Firm—Carlos Munoz-Bustamante (57) ABSTRACT

A method and system are disclosed for dynamically assigning, on a Local Area Network, through a mediator, a plurality of active routers to a plurality of hosts so as to handle hosts data packets destined to remote users not connected on the LAN. Because hosts know only the address of the mediator they must first go through it for being assigned a particular router. When receiving the first request, mediator selects one router among those of the routers that are active and informs the host which may then forward the first packet and all subsequent ones to the selected router. The same is done for each host connected on the LAN. After which mediator is free to reassess the router to host assignment any time if significant changes are observed such as the failure of a router, the removing or the addition of a router to the pool of routers or a drastic modification of the host generated traffic.

24 Claims, 6 Drawing Sheets

SYSTEM AND METHOD FOR DYNAMICALLY ASSIGNING ROUTERS TO HOSTS THROUGH A MEDIATOR

FIELD OF THE INVENTION

The present invention relates to network systems using the Internet Protocol (IP) and equipped with a plurality of routers for receiving packets from a plurality of hosts on a Local Area Network (LAN). More specifically, the invention provides for a dynamic assignment of the routers to hosts and authorizes load balancing over the hosts, the routers being seen by the hosts as a single default router.

BACKGROUND OF THE INVENTION

Local area networks (LANs) are usually connected with each other through one or more routers so that a host i.e., a Personal Computer, a Work Station, a Server or any equivalent device on a given LAN can communicate with other hosts on different LANs using the Internet Protocol (IP). Typically, the host is able to recognize only the devices on its LAN. When it receives a request to send a data packet to an address that it does not recognize, it must go to a router which determines how to direct the packet from the host towards the IP destination address. However, a router may, for a variety of reasons, become inoperative (e.g., a power failure, rebooting, scheduled maintenance, etc.). When this happens, the host that used to communicate through the inoperative router may still reach other LANs if it can forward packets to a different router, still active, connected to its LAN.

There are a number of methods that an end-host can use to determine its first hop router towards a particular IP destination. They include running a dynamic routing protocol such as Routing Information Protocol (RIP) or the Router Discovery of the Internet Control Message Protocol (ICMP). These are examples of protocols that involve dynamic participation by the host. The host in a RIP system receives the periodic routing protocol packets broadcast by the various routers. If a router stops sending protocol packets, the host assumes that the router is no longer operative and stops sending data through that router. Unfortunately, routing protocol packets contain relatively large amounts of data including all the specific routes known by the routers. Because the host periodically receives these rather large packets, the system bandwidth is reduced.

In ICMP Router Discovery, the host keeps track of operative routers by listening for router reach ability messages. These messages contain a list of IP addresses of usable routers together with preference values for those routers. Because these messages are relatively small (in comparison to routing protocol packets received by the host in RIP) and are not coupled time-wise with any routing protocol, the bandwidth utilization is improved in comparison with RIP.

However, running a dynamic routing protocol on every end-host may be unfeasible for a number of reasons, including administrative overhead, processing overhead, security issues, or lack of a protocol implementation for some platforms. Thus, a widely used and simpler approach is to have the host recognizing only a single "default" router. In this approach, the host is configured to send data packets to the default router when it needs to send packets to addresses outside its own LAN. It does not keep track of available routers or make decisions to switch to different routers. This requires very little resources on the host side, but the obvious consequence is, if the default router fails, that the host can no longer forward packets outside of its own LAN.

Therefore, to overcome this serious drawback of the default router approach which creates a single point of failure, a method known as the Hot Standby Router Protocol (HSRP), subject of the request for comments #2281 (rfc2281) of the Internet Engineering Task Force (IETF) and object of the U.S. Pat. No. 5,473,599 under the title 'Standby Router Protocol' has been devised. The goal of the protocol is to allow hosts to appear to use a single router and to maintain connectivity even if the actual first hop router they are using fails. Multiple routers, most often two, participate in this protocol and together create the illusion of a single virtual router. The protocol insures that one and only one of the routers is forwarding packets on behalf of the virtual router. The router forwarding packets is known as the active router. A standby router is selected to replace the active router should it fail. The protocol provides a mechanism for determining active and standby routers, using the IP addresses on the participating routers. Although HSRP does well what it has been designed for, i.e., provides a mechanism to support non-disruptive fail over of IP traffic in certain circumstances, in particular, to protect against the failure of the first hop router when the source host cannot learn the IP address of the first hop router dynamically, it presents the specific drawback of requiring two routers one being always in standby, waiting for the other one to die, while it could have actively participated to the forwarding of the traffic.

An alternate approach, also aimed at avoiding the single point of failure of the default router is known under the name of Virtual Router Protocol (VRRP) subject of IETF rfc2338. VRRP specifies an election protocol that dynamically assigns responsibility for a virtual router to one of the VRRP routers on a LAN. The VRRP router controlling the IP address(es) associated with a virtual router is called the Master, and forwards packets sent to these IP addresses. The election process provides dynamic fail-over in the forwarding responsibility should the Master become unavailable. Any of the virtual router's IP addresses on a LAN can then be used as the default first hop router by end-hosts. The advantage gained from using VRRP is a higher availability default path without requiring configuration of dynamic routing or router discovery protocols on every end-host. VRRP provides a function similar to the previously described HSRP protocol.

Besides the availability issue here above discussed, another important issue on a LAN comprising a plurality of routers and hosts is the ability to perform an outbound load balancing, i.e., to effectively balance the hosts related traffic over the multiple routers so as each of them is always processing a fair share of the outbound global traffic. Ideally, this should stay true even though hosts related traffic may drastically change over time. To cope with this requirement a static reconfiguration would be necessary with the solutions here above described. This may become unfeasible if adjustments need to be performed frequently say, on a daily basis just because peaks of traffic are regularly observed on some of the hosts while others are quiet.

As a consequence of the above, it would be desirable to have a network system in which the hosts are, for the sake of simplicity, not dynamically involved in router selection, while being able to dynamically reconfigure the network so as, firstly, to dynamically cope with the fluctuations of the traffic over time and, secondly, to handle router failures thus offering a non disruptive service while traffic remains well balanced over the routers in all circumstances.

BRIEF DESCRIPTION OF THE INVENTION

Thus, it is a broad purpose of the invention to allow, on a LAN, a non disruptive fail over of the outside IP traffic.

It is a further purpose of the invention to allow that hosts traffic be always spread on all available routers.

It is another purpose of the invention to permit a dynamic reconfiguration of the network if a router fails or is added, or must be changed or if hosts traffic changes significantly.

It is yet another purpose of the invention to allow that the hosts be not involved in the router selection.

Further advantages of the present invention will become apparent to the ones skilled in the art upon examination of the drawings and detailed description. It is intended that any additional advantages be incorporated herein.

A method and system are here disclosed for dynamically assigning, on a Local Area Network, through a mediator, a plurality of active routers to a plurality of hosts. The mediator, the hosts and the routers have each a unique address on the LAN for handling through the routers, data packets from the hosts destined to remote users not connected on the LAN. The method proceeds by steps of storing initially in the hosts, as default address, the address of the mediator. Then, upon sending from a particular host a first data packet towards one of the remote users not connected on the LAN, a request is first issued from that particular host, using the address of the mediator, for the purpose of being assigned a particular router. In response to the request, mediator selects one among those of the routers that are active and informs the host which may then forward the first data packet to the selected router. After which all subsequent data packets from that host are sent directly to the selected router. The same is done for each host connected on the LAN.

The mediator may decide to reassess the router to host assignment any time if significant changes are observed such as the failure of a router, the removal or the addition of a router to the pool of routers or a drastic modification of the host generated traffic.

Thus, the method and system of the invention allow to insure that IP traffic generated from the hosts for users not connected on the LAN is never interrupted and always well spread over the active routers in all circumstances without having to reconfigure the hosts.

DETAILED DESCRIPTION OF THE PREFERRED EMBODIMENT

Figure 1:
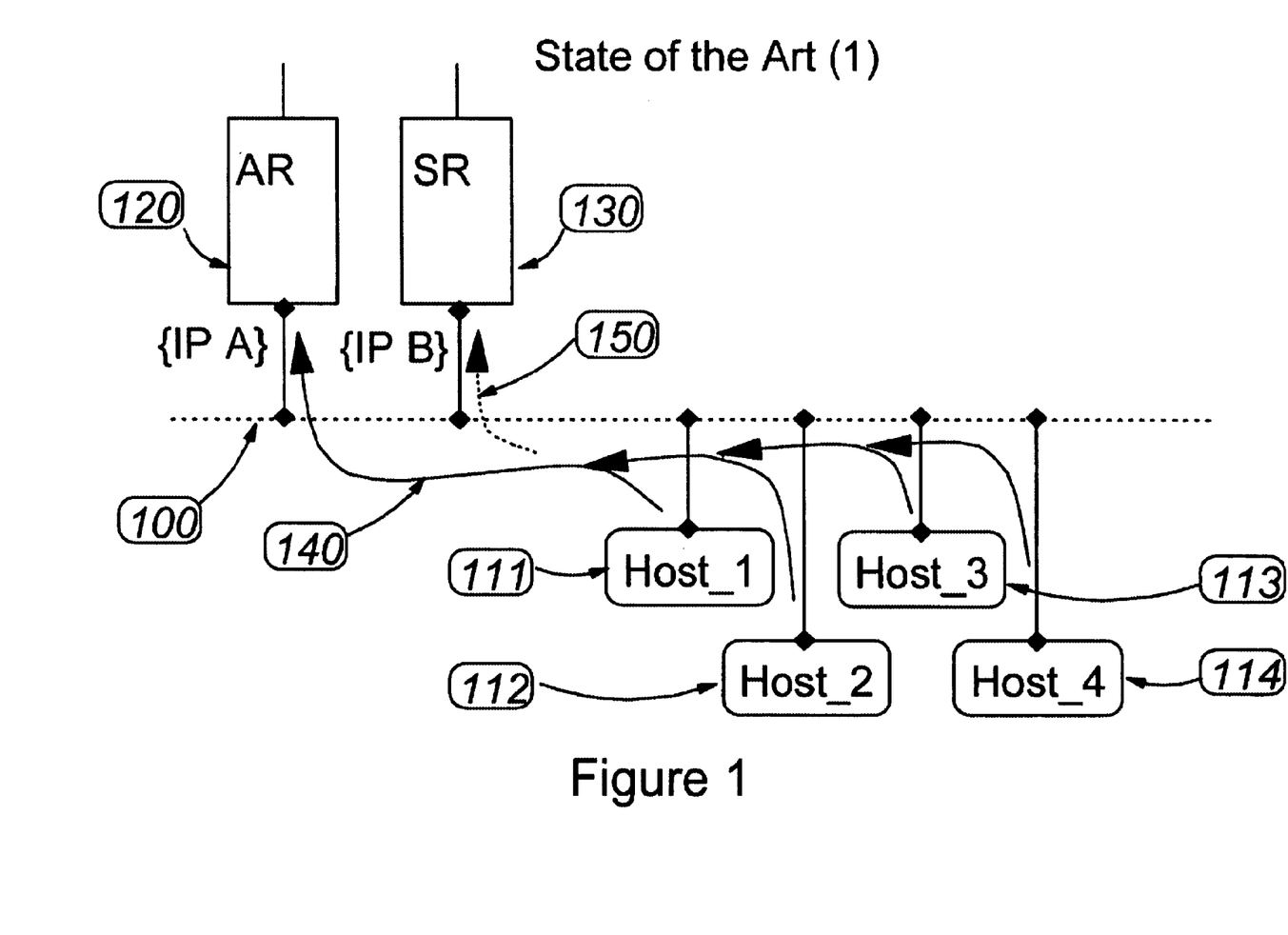
FIG. 1 describes the prior art where an active router is backed up with a hot standby router.

FIG. 1 illustrates the case of the prior art whenever a an active router [120] and a hot standby router [130] are connected to the LAN [100]. Then, the end-hosts, four in this example [111], [112], [113] and [114], all install a default route [140] to the IP address of active router [120]. In this example both routers run the Hot Standby Router Protocol (HSRP) previously mentioned. Should the active router [120] fail, the protocol manage to have the other router [130] to take over and provide uninterrupted service for the hosts through route [150]. If this method indeed permits not to have to require a dynamic routing protocol in the hosts, as it is highly desirable, the drawback is that two routers need always to be up and running while benefiting only of the performance of one of them.

Figure 2:
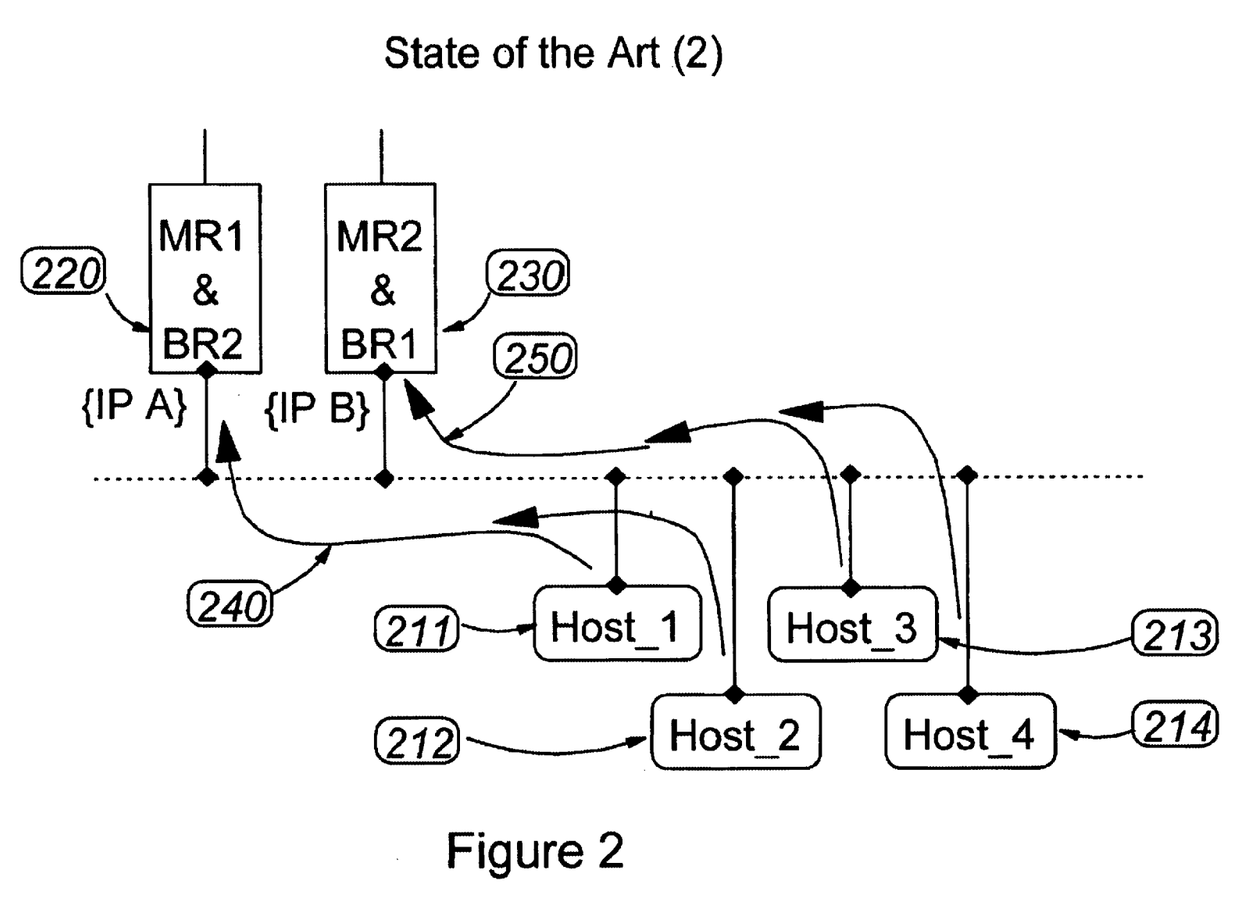
FIG. 2 describes the prior art where virtual routers are playing the role of master and/or backup routers.

FIG. 2 is another example of the prior art based on the more sophisticated Virtual Router Redundancy Protocol (VRRP) previously discussed. The figure shows a configuration with two virtual routers [220] and [230] with the hosts splitting their traffic between them. In the above configuration, half of the hosts, i.e.: hosts [211] and [212], install a default route [240] to virtual router [220] having IP address {IPA} and the other half of the hosts i.e.: hosts [213] and [214], install a default route [250] to virtual router [230] having IP address {IP B}. This has the effect of load balancing somehow the outgoing traffic, while also providing full redundancy because if router [220] is the master for two of the hosts [211] and [212] VRRP protocol allows it to be also a back up for the other two hosts [213] and [214]. And the reverse is true for router [230]. Then, on contrary of the previous example, in normal operation the two routers are active and forward IP traffic contributing to achieve overall better performance for the LAN. Should one of the router fail the one remaining will have to bear the whole traffic until situation soon returns to normal. Thus, the customers on the LAN are most of the time benefiting of the performance of the two routers working in concert.

If this approach is more satisfactory it still fails meeting all the objectives of the invention which wants that the network be dynamically reconfigure able so that the variations of traffic can always be well distributed over a set of routers connected on the LAN while still offering a non-disruptive service for the outside IP traffic.

Figure 3:
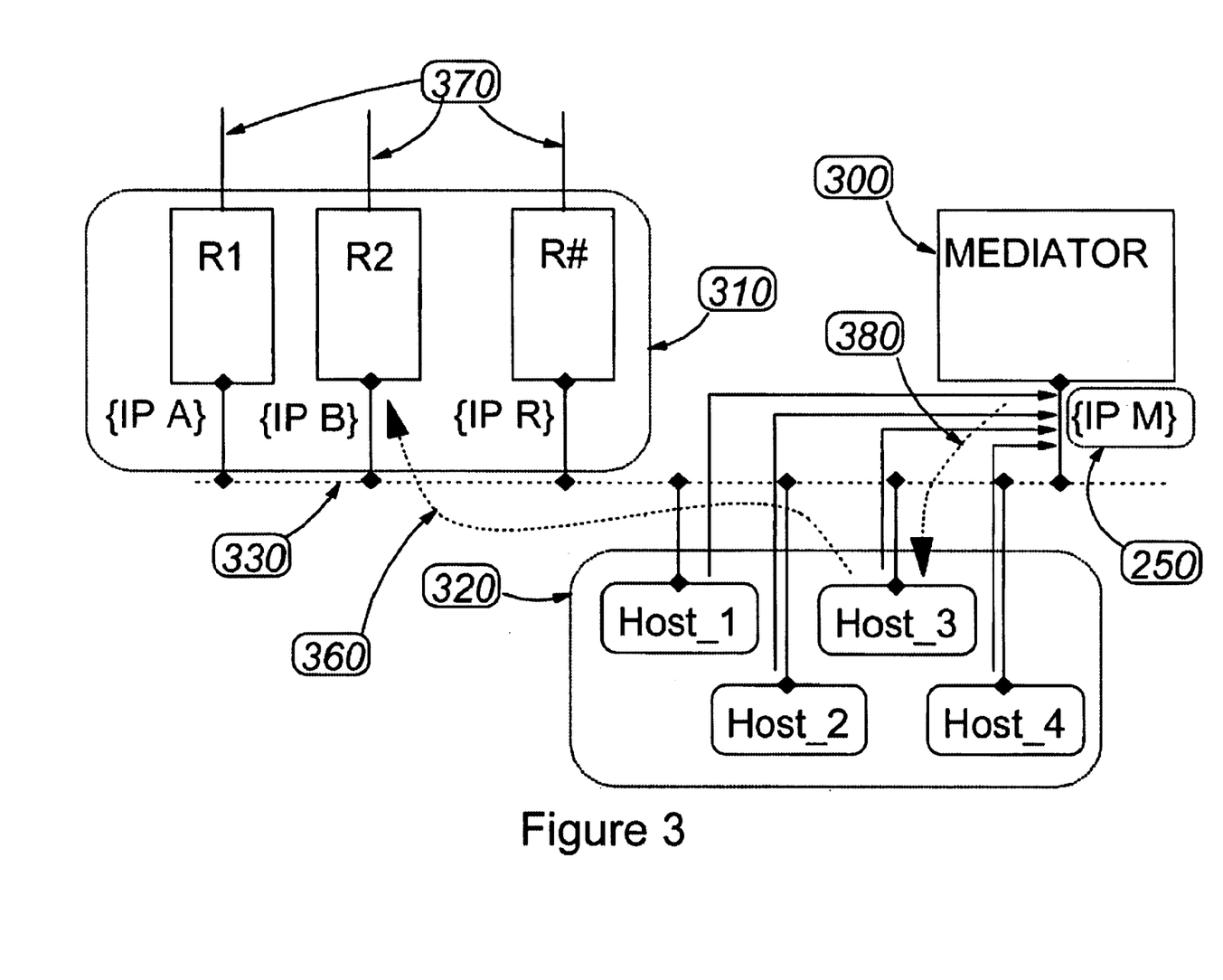
FIG. 3 describes the concept of the invention introducing a mediator.

FIG. 3 depicts the principle of the invention introducing a new device referred to as a mediator [300]. In this approach the routers are, on contrary of the solutions of the art, undifferentiated i.e., there is no master, back-up or standby designated router. It exists at some point of time, connected on the LAN [330], a pool of routers [310] in charge of handling LAN outside IP traffic. It is mediator responsibility to manage the global resources of the pool of routers so as the set of hosts present on the LAN [320] have their traffic handled at best. Should a router fail, need to be replaced or a new router be added to the pool, the traffic with the hosts is reassessed by the mediator [300]. To do so, all the hosts connected to the LAN [320] are configured with the default router address [250] of the mediator. Mediator, which runs IP protocols, is not actually a router. On contrary of the pool of routers which have connections [370] to the other LANs of an enterprise or campus network or to the Internet, mediator is in charge of watching LAN activity and cannot forward outside traffic. Thus, mediator is any type of processing unit connected on a LAN and running IP protocols say, a work station or a virtual machine on a work station. Then, when one of the hosts [320] wakes up or is restarted e.g., Host_3, it first goes to the mediator since it is configured with the default address [250] of the mediator and doesn't know any of the router addresses of the pool of routers [310]. Then, mediator responds with command [380] to the host, Host_3 in this example, with the address of the particular router e.g., R2 it has selected from the pool of router [310] so that all further outgoing outside transactions of Host_3 [360] will be handled through this router. All of this is potentially reevaluated upon mediator initiative which is constantly monitoring the activity on the LAN [330] and is free of reissuing command [380] whenever it decides to modifying the assignment of the router it has first chosen. This protocol is implemented from standard IP protocols, in particular from the IP Address Resolution Protocol (ARP) and is further discussed in next figure.

Figure 4:
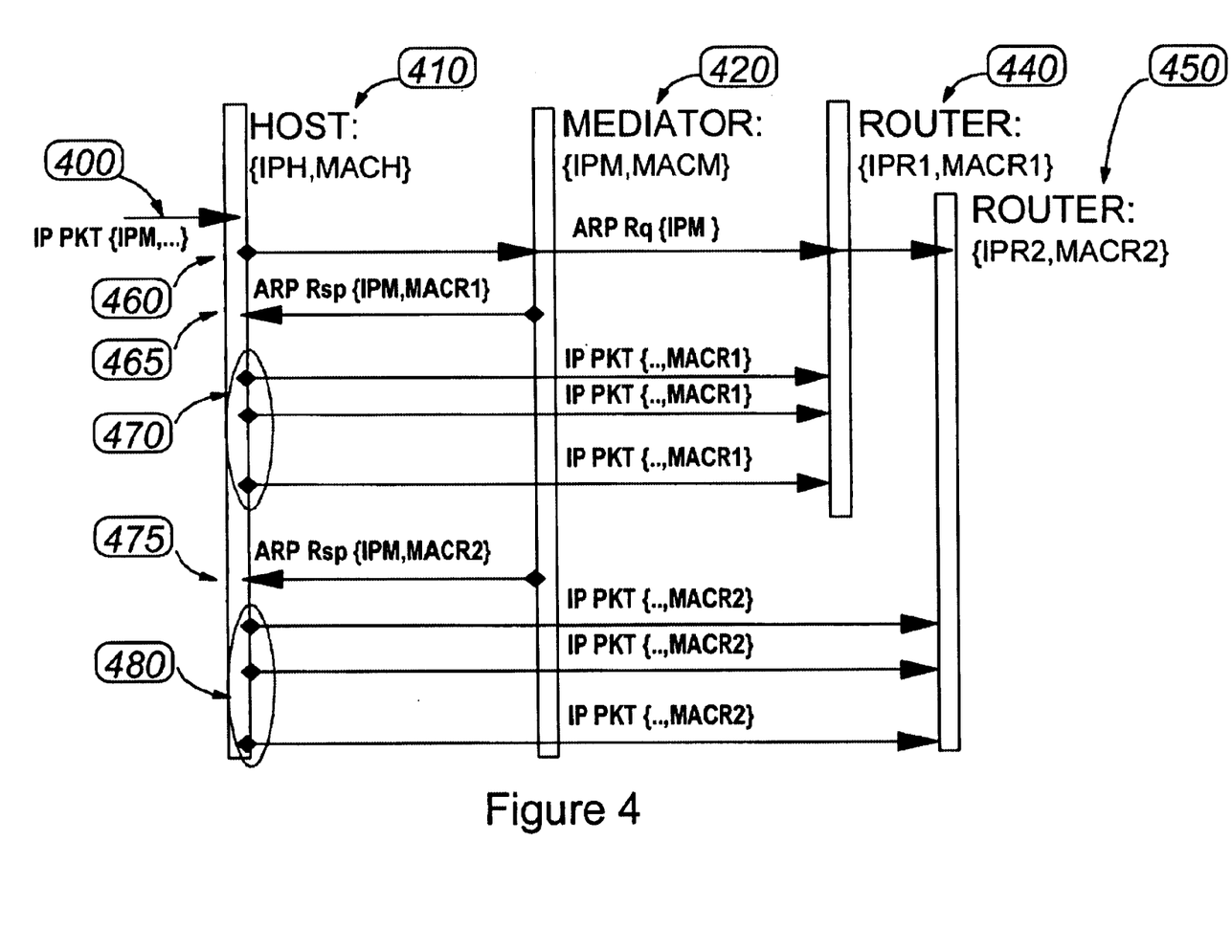
FIG. 4 is an example of how invention is implemented based on the IP Address Resolution Protocol (ARP)

FIG. 4 depicts how ARP is utilized for implementing the invention. After a host [410] has been restarted the first IP packet destined to an outside location is using the default address [400] it has been programmed i.e., the IP address of the mediator {IPM, . . . } as explained previously. However, because host [400] has not yet any corresponding Medium Access Control (MAC) address it may match with the default IP address it must broadcast an ARP request [460] to all devices on the LAN to which only mediator [420] is going to respond with an ARP Response [465] hence associating IP address {IPM . . . } with the MAC address {. . . , MACR1} of the router [440] the mediator has chosen for handling host [410] IP outside traffic. Thus, all further IP packets destined to an outside location [470] are sent directly to router [440] having MAC address {. . . , MACR1}. This goes on until mediator decides, based on the observation of the traffic on the LAN, that router [450] should be used instead which triggers the sending, to host [410], of another ARP response [475] (Gratuitous ARP response) this time associating the IP address of the mediator to the MAC address {. . . , MACR2} of the router [450]. After which all further IP packets are forwarded directly to router [450] until mediator decide to change again if necessary.

Figure 5A:
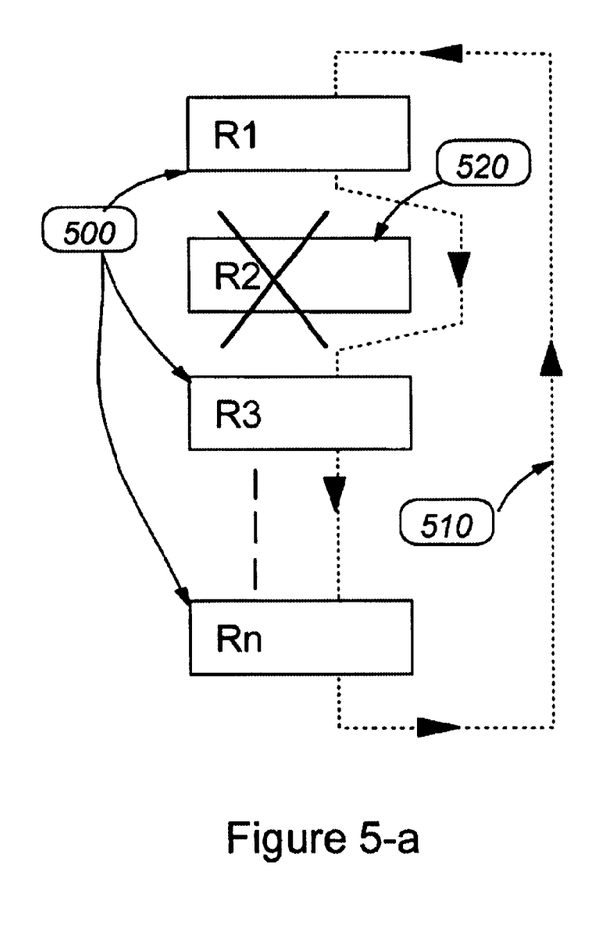
FIG. 5 gives examples of various levels of sophistication at which the invention can be implemented.

FIG. 5 reviews various solutions that are examples of how invention can be implemented at various level of sophistication. FIG. 5-a is a memoryless, stateless elementary implementation in which mediator does not know almost anything about the routers but which ones are up and running [500] at any given time. In this solution the hosts are linked to routers using a round robin sequence [510] however, skipping those of the routers that are down [520]. In this elementary approach whenever a host is becoming active or is reinitialized it is attributed the next in sequence of the operative routers regardless of its current charge. Whenever a router is down it is removed from the list of up routers and the hosts it was handling re-affected to the next router(s) in sequence. This scheme assumes only that up and down routers must be tracked which is simply carried out by well known methods from the art.

Figure 5B:
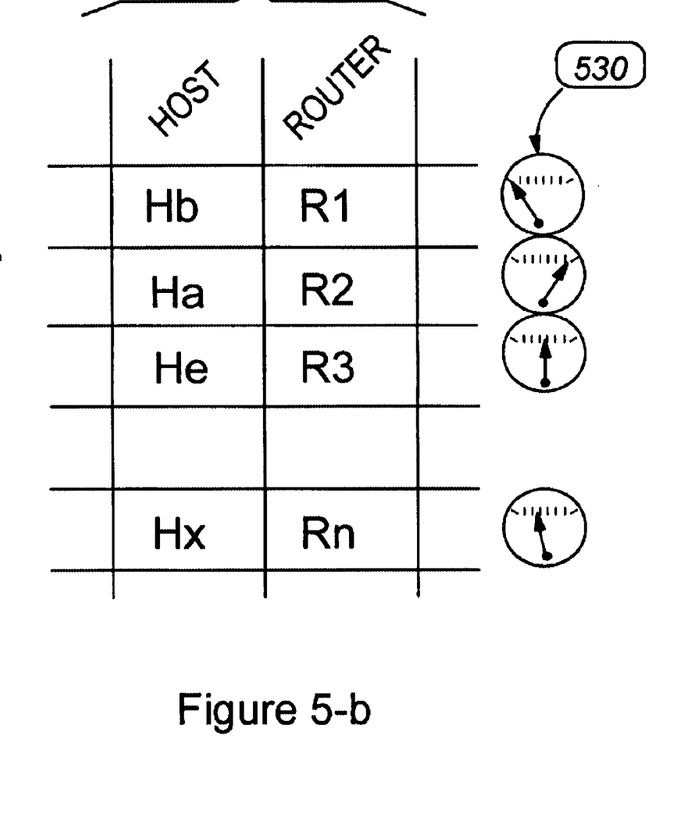

Another example shown in FIG. 5-b is when mediator is able to receive or collect, in one way or another at regular intervals, information on routers activity [530], so that to determine how much busy routers are. A metric can be, for example, the number of IP packets forwarded per unit of time or the time router processor is active i.e., is busy processing IP traffic. In this approach a cross reference table [540] is remembered of the routers and hosts that are linked in order that mediator may reassess load balancing based on the observed actual load of each router. Whenever a router is significantly exceeding its fair share of the outbound IP traffic router-host liaisons are reassessed in an attempt to reach a better spreading of the outside IP traffic.

Figure 5C:
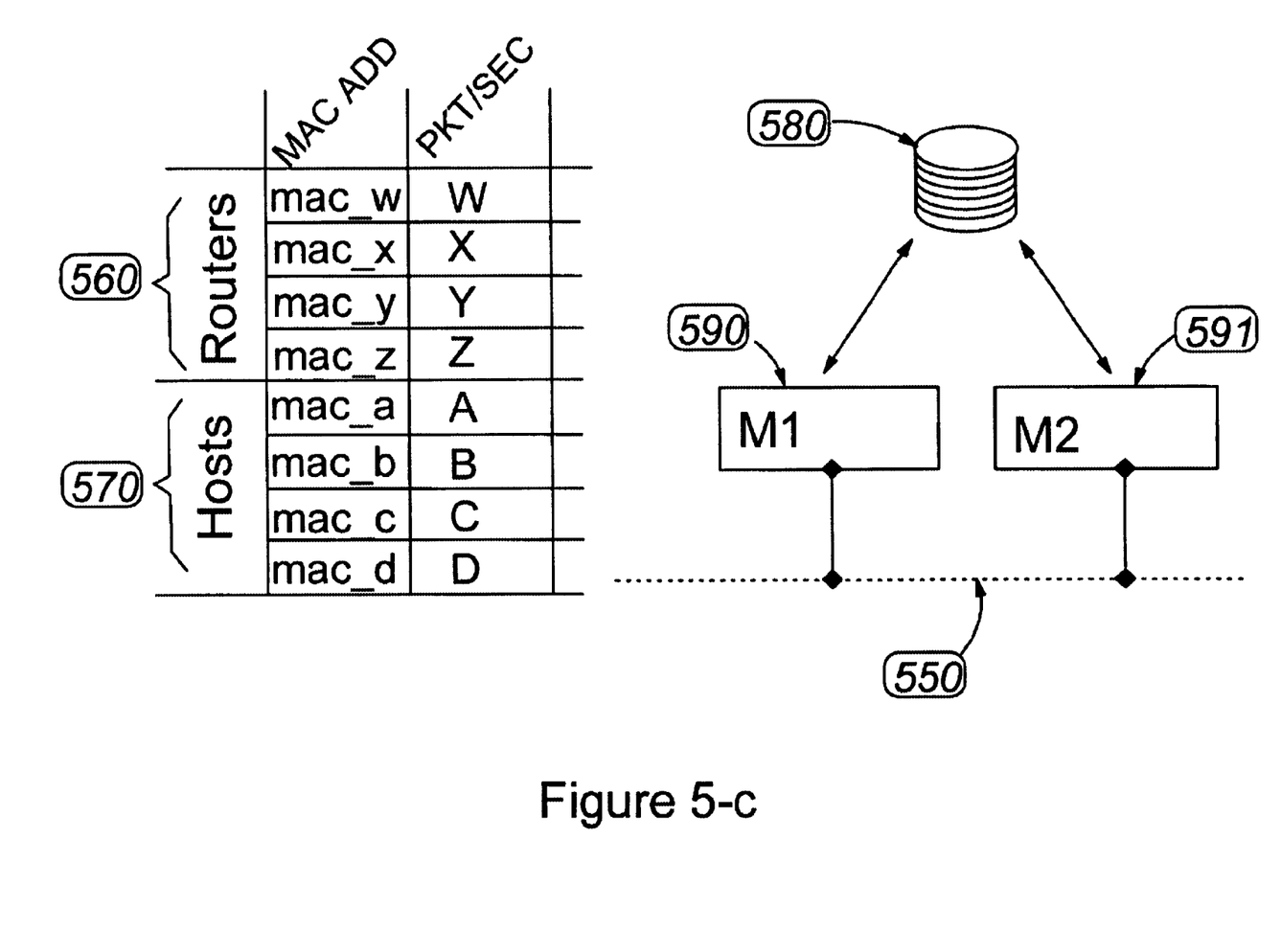

A final example in FIG. 5-c is when mediator is snooping on the LAN [550] keeping track of all IP packets that are forwarded by the routers [560] along with the packets generated on a per host basis [570] so as to have all the necessary information to fine tuned the overall outside host traffic over the pool of routers. In this latter case an even more sophisticated implementation of the solution would allow sharing the host-router activity data base [580] between an active [590] and a standby [591] mediator that may take over whenever the active mediator is failing or need to be maintained or replaced. This would go unnoticed by the hosts and routers even though the switch over is not instantaneous since the established connections are not disturbed due to the failure of the mediator. Mediator assistance is required when a new host or router is added or removed, when a host is reinitialized, when traffic is changing significantly or if a router dies. In steady state the network can tolerate the absence of the mediator as long as the host-router need not to be changed.

What is claimed is:

1. A method for dynamically assigning, on a Local Area Network, through a mediator, a plurality of active routers to a plurality of hosts, said mediator, said hosts and said routers having each a unique address on said LAN for handling through said routers, data packets from said hosts destined to remote users not connected on said LAN, said method comprising the steps of;

storing the address of said mediator initially in said hosts as a default address;

upon sending a first data packet from a particular host among said plurality of hosts towards one of said remote users not connected on said LAN:

issuing, from said particular host with said default address, a request for being assigned a particular router among said plurality of active routers;

selecting, in said mediator, on behalf of said particular host, a particular router, among said plurality of active routers;

receiving, in said particular host, instructions from said mediator for using said selected router;

forwarding said first data packet to said selected router;

upon sending subsequent data packets from said particular host towards said remote users not connected on said LAN:

continuing forwarding said data packets to said selected router; and repeating all herein steps for each host among said plurality of hosts.

2. The method of claim 1 wherein the step of selecting a particular router further includes the step of using any round robin sequence skipping inoperative routers.

3. The method of claim 1 wherein said mediator is monitoring routers activity and where said step of selecting a router further comprises the step of using said router activity as a criterion for choosing a router.

4. The method of claim 1 wherein said mediator is monitoring the number of host generated data packets towards said remote users not connected on said LAN and where said step of selecting a router further comprises the step of using said number of host generated data packets as a criterion for choosing a router.

5. The method of claim 1 wherein the method of dynamically assigning a router to a host is reassessed periodically.

6. The method of claim 1 wherein the method of dynamically assigning a router to a host is reassessed upon determining when a router is becoming inoperative or is becoming operative.

7. The method of claim 1 wherein two mediators which share a database are used, only one of the mediators being active while the other one of the mediators is in standby, said method further including the steps of:

determining which mediator is active;

monitoring said active mediator by said standby mediator; and     taking over the role of active mediator by said standby mediator whenever said active mediator becomes inoperative.

8. The method of claim 1 wherein the steps of issuing a request from a host and receiving instructions for using a router are done with the IP Address Resolution Protocol.

9. A system comprising:

a mediator, a plurality of hosts, and a plurality of routers, the mediator, hosts and routers being coupled on a Local Area Network (LAN), said system comprising logic which dynamically assigns, through said mediator, a plurality of active routers to a plurality of hosts, said mediator, said hosts and said routers having each a unique address on said LAN for handling through said routers, data packets from said hosts destined to remote users not connected on said LAN, said logic being effective to:

store the address of said mediator initially in said hosts as a default address;

upon sending a first data packet from a particular host among said plurality of hosts towards one of said remote users not connected on said LAN:
   issue, from said particular host with said default address, a request for being assigned a particular router among said plurality of active routers;

select, in said mediator, on behalf of said particular host, a particular router, among said plurality of active routers;

receive, in said particular host, instructions from said mediator for using said selected router;

forward said first data packet to said selected router;

upon sending subsequent data packets from said particular host towards said remote users not connected on said LAN:
   continue forwarding said data packets to said selected router; and repeating all herein steps for each host among said plurality of hosts.

10. The system of claim 9 wherein the logic which selects a router further includes the use of any round robin sequence skipping inoperative routers.

11. The system of claim 9 wherein said mediator is monitoring routers activity and wherein the logic which selects a router further comprises the use of the router activity as a criterion for choosing a router.

12. The system of claim 9 wherein said mediator is monitoring the number of host generated data packets towards said remote users not connected on said LAN and wherein the logic which selects a router further comprises the use of said number of host generated data packets as a criterion for choosing a router.

13. The system of claim 9 wherein the dynamic assignment of a router to a host is reassessed periodically.

14. The system of claim 9 wherein the dynamic assignment of a router to a host is reassessed upon determining when a router changes states wherein the state is a state in which a router becomes inoperative or a state in which a router becomes operative.

15. The system of claim 9 wherein two mediators which share a database are used, only one of the mediators being active while the other one of the mediators is in standby, wherein the logic is further effective to:
   determine which mediator is active;
   monitor said active mediator by said standby mediator; and
   take over the role of active mediator by said standby mediator whenever said active mediator becomes inoperative.

16. The system of claim 9 wherein the logic which issues a request from a host and receives instructions for using a router are done with the IP Address Resolution Protocol.

17. A product comprising:
a computer usable medium having computer readable program code stored therein for dynamically assigning, on a Local Area Network, through a mediator, a plurality of active routers to a plurality of hosts, said mediator, said hosts and said routers having each a unique address on said LAN for handling through said routers, data packets from said hosts destined to remote users not connected on said LAN, the computer readable program code in said program product being effective when executing to:

store the address of said mediator initially in said hosts as a default address;

upon sending a first data packet from a particular host among said plurality of hosts towards one of said remote users not connected on said LAN:
   issue, from said particular host with said default address, a request for being assigned a particular router among said plurality of active routers;

select, in said mediator, on behalf of said particular host, a particular router, among said plurality of active routers;

receive, in said particular host, instructions from said mediator for using said selected router;

forward said first data packet to said selected router;

upon sending subsequent data packets from said particular host towards said remote users not connected on said LAN:
   continue forwarding said data packets to said selected router; and repeating all herein steps for each host among said plurality of hosts.

18. The system of claim 17 wherein the code which selects a router further includes the use of any round robin sequence skipping inoperative routers.

19. The system of claim 17 wherein said mediator is monitoring routers activity and wherein the code which selects a router further comprises the use of the router activity as a criterion for choosing a router.

20. The system of claim 17 wherein said mediator is monitoring the number of host generated data packets towards said remote users not connected on said LAN and wherein the code which selects a router further comprises the use of said number of host generated data packets as a criterion for choosing a router.

21. The system of claim 17 wherein the dynamic assignment of a router to a host is reassessed periodically.

22. The system of claim 17 wherein the dynamic assignment of a router to a host is reassessed upon determining when a router changes states wherein the state is a state in which a router becomes inoperative or a state in which a router becomes operative.

23. The system of claim 17 wherein two mediators which share a database are used, only one of the mediators being active while the other one of the mediators is in standby, wherein the code is further effective to:
   determine which mediator is active;
   monitor said active mediator by said standby mediator; and
   take over the role of active mediator by said standby mediator whenever said active mediator becomes inoperative.

24. The system of claim 17 wherein the code which issues a request from a host and receives instructions for using a router are done with the IP Address Resolution Protocol.

\* \* \* \* \*